(No Model.)

A. W. FIELD.
BRAKE SHOE.

No. 529,372. Patented Nov. 20, 1894.

Attest:
C. W. Benjamin
J. Kennedy

Inventor
Arthur W. Field
by W. P. Preble Jr.
his atty

UNITED STATES PATENT OFFICE.

ARTHUR W. FIELD, OF BOSTON, MASSACHUSETTS.

BRAKE-SHOE.

SPECIFICATION forming part of Letters Patent No. 529,372, dated November 20, 1894.

Application filed March 7, 1894. Serial No. 502,607. (No model.)

*To all whom it may concern:*

Be it known that I, ARTHUR W. FIELD, a citizen of the United States, residing in the city of Boston, county of Suffolk, and Commonwealth of Massachusetts, have invented certain new and useful Improvements in Car-Brake Shoes, of which the following is a specification.

My invention consists in providing an improved car brake shoe, in which the friction surface is made more durable than heretofore thereby prolonging the life of the shoe.

One form of my improved shoe is shown in the accompanying drawings, in which—

Figure 1:
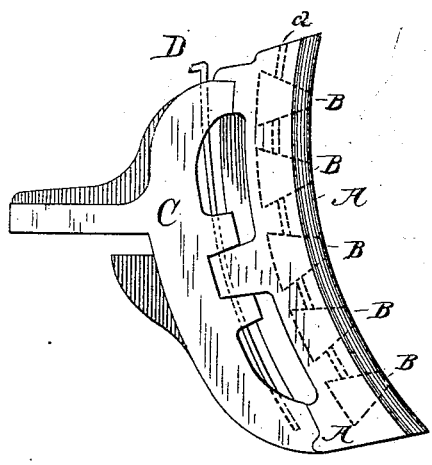
Figure 2:
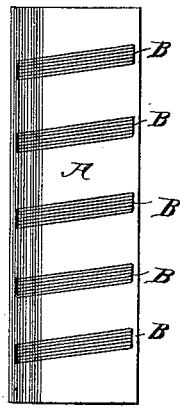

Figure 1 is a side elevation. Fig. 2 is a face view.

Same letters indicate similar parts in both the figures.

A is the main body of the shoe of iron, or other suitable material, of the usual configuration to fit the wheel, upon which it is to act.

B represents masses of glass or other suitable composition inserted in said iron body, so that the larger portion of the composition is embedded therein or dovetailed, and presents a series of stripes of surface, as shown in Fig. 2, to make contact with the car wheel. This glass or other composition is preferably inserted in a molten or plastic state, the iron body being previously prepared with suitable cavities larger at the base than at the mouth, into which said glass or composition is poured and then allowed to cool. The filling of these cavities may be made either separately from the mouth downward or by providing a filling channel *a*, shown in dotted lines in Fig. 1, connecting these cavities with each other. These cavities are preferably arranged at an angle as shown in Fig. 2 thereby avoiding chattering.

C represents the extremity of the car brake of usual construction and D, the pin of usual construction for holding car brake shoes of this configuration to the car brake.

The combination of glass or kindred composition and iron results in making a practically indestructible surface as the iron takes up practically all the heat caused by use and carries it away from the glass thereby preventing the latter from wearing out.

The advantage of my improved car brake shoe in thus presenting a practically indestructible surface of glass and iron as a bearing surface on the car wheel, will be readily understood without further description.

I claim—

The above described car brake shoe, which consists of a body provided with a series of cavities larger at the base than at the mouth, the mouths of said cavities being arranged at an angle across the face of the shoe, a filling channel connecting said cavities near the bottom, and a mass of glass filling said cavities flush with the face of said shoe and constituting a series of friction surfaces adapted to come in contact with the surface of the car wheel, substantially as shown and described.

ARTHUR W. FIELD.

Witnesses:
W. P. PREBLE, Jr.,
J. KENNEDY.